United States Patent
Reitz et al.

(10) Patent No.: US 8,113,925 B2
(45) Date of Patent: Feb. 14, 2012

(54) DISPLACEMENT ELEMENTS FOR A CLIP MACHINE

(75) Inventors: Jürgen Reitz, Eschborn (DE); Manfred Waldstädt, Mainz (DE)

(73) Assignee: Poly-clip System GmbH & Co. KG, Frankfurt am Main (DE)

( * ) Notice: Subject to any disclaimer, the term of this patent is extended or adjusted under 35 U.S.C. 154(b) by 0 days.

(21) Appl. No.: 12/616,481

(22) Filed: Nov. 11, 2009

(65) Prior Publication Data

US 2010/0124874 A1  May 20, 2010

(30) Foreign Application Priority Data

Nov. 14, 2008 (DE) .................. 10 2008 057 293

(51) Int. Cl.
A22C 11/00 (2006.01)
A22C 11/10 (2006.01)
(52) U.S. Cl. ................. 452/48; 452/37; 452/46
(58) Field of Classification Search .......... 452/30, 452/35, 37, 46, 47, 48, 49
See application file for complete search history.

(56) References Cited

U.S. PATENT DOCUMENTS

| | | | | |
|---|---|---|---|---|
| 1,545,586 A | * | 7/1925 | Kruse | 452/47 |
| 3,296,657 A | * | 1/1967 | Moekle | 452/35 |
| 3,328,835 A | | 7/1967 | Gartrell | |
| 4,214,492 A | * | 7/1980 | Hoffman | 83/24 |
| 4,434,528 A | * | 3/1984 | Niedecker | 452/37 |
| 4,463,477 A | * | 8/1984 | Ziolko | 452/49 |
| 5,104,349 A | * | 4/1992 | Van Der Dungen | 452/51 |
| 6,524,178 B1 | | 2/2003 | Fassler et al. | |
| 7,625,266 B2 | * | 12/2009 | Bontjer et al. | 452/49 |
| 7,654,889 B2 | | 2/2010 | Ebert et al. | |

FOREIGN PATENT DOCUMENTS

| | | |
|---|---|---|
| DE | 1586210 A1 | 5/1970 |
| DE | 2550042 A | 5/1977 |
| EP | 1095570 A1 | 5/2001 |
| NL | 8900292 A | 9/1990 |

OTHER PUBLICATIONS

EP 09 01 4011 Search Report.

* cited by examiner

*Primary Examiner* — David Parsley
(74) *Attorney, Agent, or Firm* — Hahn Loeser & Parks LLP; Bret A. Hrivnak, Esq.

(57) ABSTRACT

A displacer assembly for a clip machine, in particular a sausage clip machine, including at least a first pair of displacer shears and a second pair of displacer shears arranged parallel thereto. The displacer shears are arranged pivotably about a common axis and are reversibly movable towards each other for constriction of the filled packaging casing for forming a filling material-free plaited portion. In that respect the first pair of displacer shears comprises two displacer shears which are at least approximately identical in minor image relationship and the second pair of displacer shears has a second displacer shear which is at least approximately identical to the displacer shears of the first pair of displacer shears, as well as a first, shorter displacer shear. The first displacer shear of the first pair of displacer shears has a reinforcement which at least approximately reproduces the contour of the part, which is cut off for shortening purposes, of the first displacer shear of the second pair of displacer shears.

8 Claims, 2 Drawing Sheets

DISPLACEMENT ELEMENTS FOR A CLIP MACHINE

BACKGROUND OF THE INVENTION

The invention concerns a displacer assembly for a clip machine, in particular a sausage clip machine. In particular the invention concerns a displacer assembly for a clip machine, in particular a sausage clip machine, which includes: at least a first pair of displacer shears and a second pair of displacer shears arranged parallel thereto, wherein the displacer shears are reversibly movable towards each other to constrict the filled packaging casing to form a filling material-free plaited end portion. In that case the first pair of displacer shears comprises two displacer shears which are at least approximately identical in minor image relationship. The second pair of displacer shears has a first displacer shear which is at least approximately identical to the displacer shears of the first pair of displacer shears and a second shorter displacer shear.

A clip machine of the kind set forth hereinbefore, which is known for example from German patent specification No 25 50 042, is typically used to close packaging casings in bag or tubular form and filled with liquid to thick-pasty or also (in part) granular content. Firstly in that procedure the filling material is introduced into the packaging casing and—in the case of a tubular packaging casing—thereafter divided up into portions (sausages) by means of the for example pairs of displacer shears of the displacer assembly. The pairs of displacer shears which are arranged pivotably about a common axis in a radial direction or transversely with respect to the conveyor direction of the filling material constrict the packaging casing for that purpose and displace the filling material which is in the constriction region in the axial direction or in the conveyor direction of the filling material. A filling material-free tubular plaited portion is thus formed in the constriction region. In the next working cycle a closure clamp or clip or, in the case of a double clip arrangement, two closure clamps or clips are applied to the tubular plaited portion formed in that way, by means of the above-described closure tools which are movable relative to each other. If the product in sausage form is to be suspended for example on a smoking bar for further transport or for further processing, a suspension element such as a loop of thread is introduced into one of the closure clips and fixed to the closure clip at the tubular plaited portion. After the product in sausage form has been closed by fitment of closure clamps or clips the pairs of displacer shears are moved away from each other and permit the product in sausage form to pass through.

European patent application No 1 886 573 (US 20080085668) discloses a clip machine in which the displacer assembly has displacer shears which, for constriction of the filled packaging casing, are reversibly movable towards each other along a linear guide.

In practice it is further known that, in particular in the production of products in sausage form with a suspension element, which immediately after production are to be automatically placed by means of their suspension element on a suspension arrangement, the lower displacer shear of the pair of displacer shears which faces in the conveyor direction of the filling material is shorter than the other displacer shears. That shortening of that displacer shear is necessary in order to release the suspension element which is disposed in the otherwise closed structure of the displacer shears and which is held by the closure clip between the displacer shears and the catch device in the conveyor direction downstream of the displacer shears.

Those previously known clip machines however suffer from disadvantages. Thus it is not possible to exclude the possibility that the shortened displacer shear, particularly when the products in sausage form are of large diameters and/or when dealing with delicate packaging casings, penetrates into the packaging casing during the constriction procedure and thus form a fold which can no longer be engaged by the closure clip. It is also not possible to exclude damage to the packaging casing.

The object of the present invention is to overcome the above-indicated disadvantages and to provide a displacer assembly for a clip machine, which makes the closure procedure a more reliable process.

SUMMARY OF THE INVENTION

There is proposed a displacer assembly for a clip machine, in particular a sausage clip machine, which has: at least a first pair of displacer shears and a second pair of displacer shears that is arranged parallel thereto. The displacer shears are reversibly movable towards each other to constrict the filled packaging casing to form a filling material-free plaited end portion. In that case the first pair of displacer shears comprises two displacer shears which are at least approximately identical in mirror image relationship. The second pair of displacer shears has a second displacer shear which is at least approximately identical to the displacer shears of the first pair of displacer shears, and a first, shorter displacer shear. According to the invention it is provided that the first displacer shear of the first pair of displacer shears has a reinforcement which at least approximately reproduces the contour of the part, which is cut off for shortening purposes, of the first displacer shear of the second pair of displacer shears. In an advantageous configuration of the displacer assembly according to the invention it is provided that the reinforcement is arranged on the side of the first displacer shear of the first pair of displacer shears, that is directed towards the second pair of displacer shears.

Such a reinforcement or thickened portion provides for closing the gap produced by the reduction in length of the first shorter displacer shear of the second pair of displacer shears between the second displacer shears, which have been moved together, of the two pairs of displacer shears. That thus effectively prevents the packaging casing from being damaged or pinched.

In that respect it is advantageous if a gap is formed between the radially outwardly facing surface of the first displacer shear of the second pair of displacer shears and the surface which faces theretowards of the reinforcement. That prevents the end of the shorter displacer shear, that faces away from the pivot point, from colliding with the reinforcement. As a result the shortened displacer shear can bear over the full surface area involved against the first displacer shear of the first pair of displacer shears.

To make the constriction procedure even more reliable and to further minimize damage to the tubular packaging the dimension of the gap must be reduced to a minimum. In order nonetheless to ensure that the pairs of displacer shears move together reliably and without collision it is further advantageous if the gap is oriented at an acute angle to the axis of the plaited portion.

The reinforcement can be implemented in various ways. In a first embodiment the reinforcement is an individual element which is screwed onto or welded to the second displacer shear of the first pair of displacer shears. As the reinforcement is not subjected to any extreme loadings, it can also be fixed by gluing or riveting to the second displacer shear of the first pair of displacer shears. Thus a reinforcement provided in the form of an individual element can be retro-fitted in relationship to displacer assemblies of already existing clip machines.

It is however equally possible for the reinforcement to be integrally connected to the first displacer shear of the first pair of displacer shears. That can be achieved for example by the reinforcement already being formed on the displacer shear in manufacture thereof.

Further features and advantages of the invention are described in greater detail hereinafter by means of an embodiment by way of example with reference to the drawings. The terms "left", "right", "top" and "bottom" used throughout the description relate to the drawings in an orientation with the references and Figure identifications being normally readable. In the Figures:

DETAILED DESCRIPTION OF THE INVENTION

Figure 1:
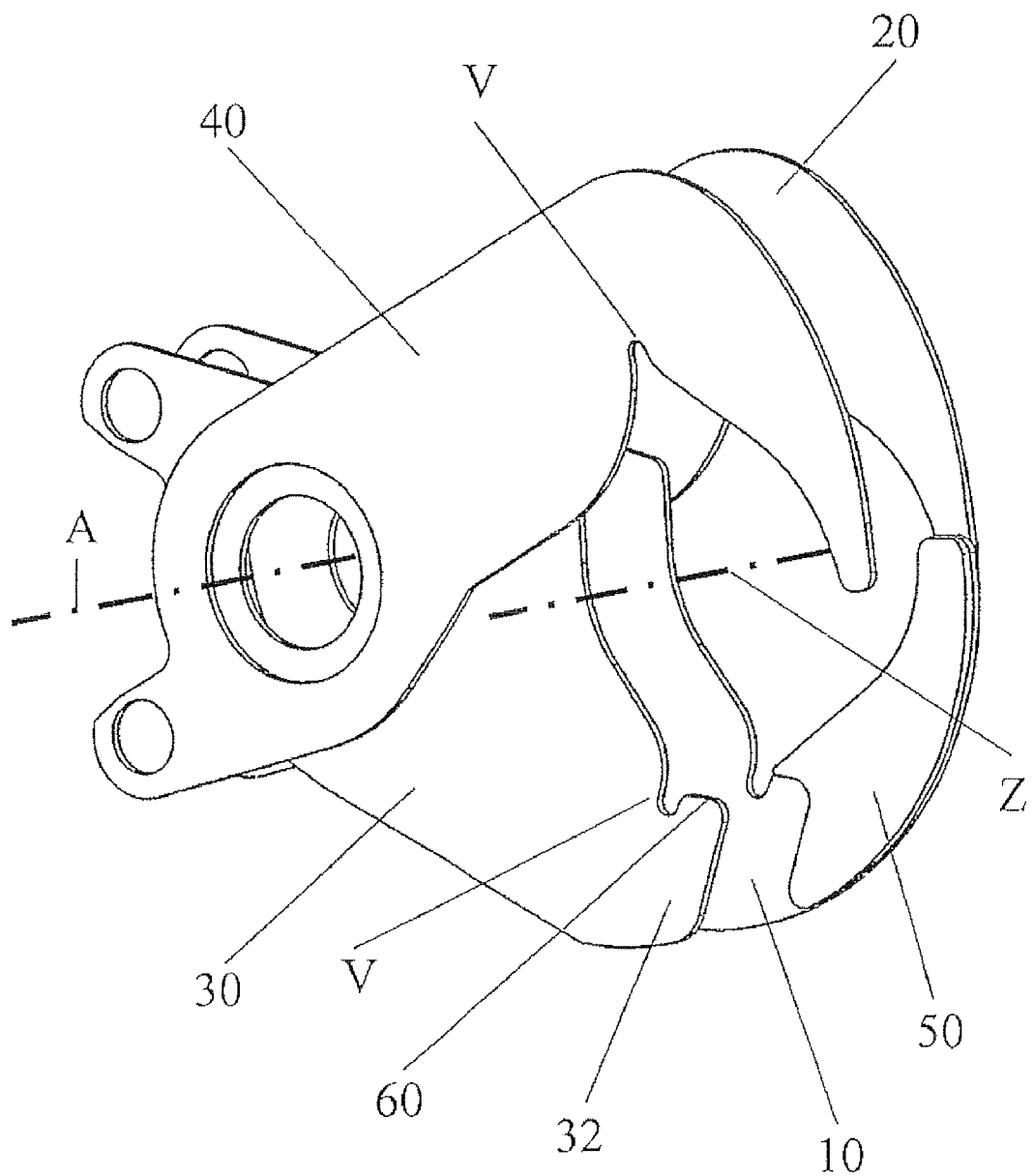
FIG. 1 shows an embodiment of the pairs of displacer shears of the displacer assembly according to the invention in a first position.

Referring to FIG. 1 the displacer assembly according to the invention has a first pair of displacer shears 10, 20 and a second pair of displacer shears 30, 40 which are oriented in mutually parallel relationship and are arranged reversibly pivotably towards each other about a common axis A. To produce the reversible pivotal movement of the displacer shears 10, 20, 30, 40 there is provided a drive (not shown in FIG. 1) engaging the ends of the displacer shears 10, 20, 30, 40, which face towards the left from the pivot axis A. The respective first displacer shears 10, 30 and the second displacer shears 20, 40 of the pairs of displacer shears 10, 20, 30, 40 are disposed in this case in at least approximately coincident mutually juxtaposed relationship. The ends of the displacer shears, that face from the common pivot axis A in the direction of the plaited portion axis Z are angled in a hook shape in such a way that the ends of the first and second displacer shears 10, 30 and 20, 40 are directed towards each other, with their tips slightly overlapping.

As can be seen from FIG. 1 the first displacer shear 30 of the second pair of displacer shears 30, 40 is shorter than the first displacer shear 10 of the first pair of displacer shears 10, 20. The displacer shear 30 ends immediately after the recess V in an end portion 32, as viewed from the axis A.

A reinforcement 50 is provided at the side of the displacer shear 10, that faces towards the displacer shear 30. The plate-shaped reinforcement or plate portion 50 corresponds in its thickness and contour to the portion of the displacer shear 10 to which it is fixed and against which it bears in coincident relationship over the full surface area involved.

FIG. 1 shows the pairs of displacer shears 10, 20 and 30, 40 in a first position or readiness position in which the displacer shears 10, 20, 30, 40 are moved away from each other both in the axial direction and also in the radial direction.

As can be clearly seen from FIG. 1 the first displacer shear 30 of the second pair of displacer shears 30, 40 is shortened in relation to the first displacer shear 10 of the first pair of displacer shears 10, 20. The plate portion 50 corresponding to that reduction in length is arranged on the side of the displacer shear 10, that faces towards the second pair of displacer shears 30, 40, and is fixedly joined thereto.

Figure 2:
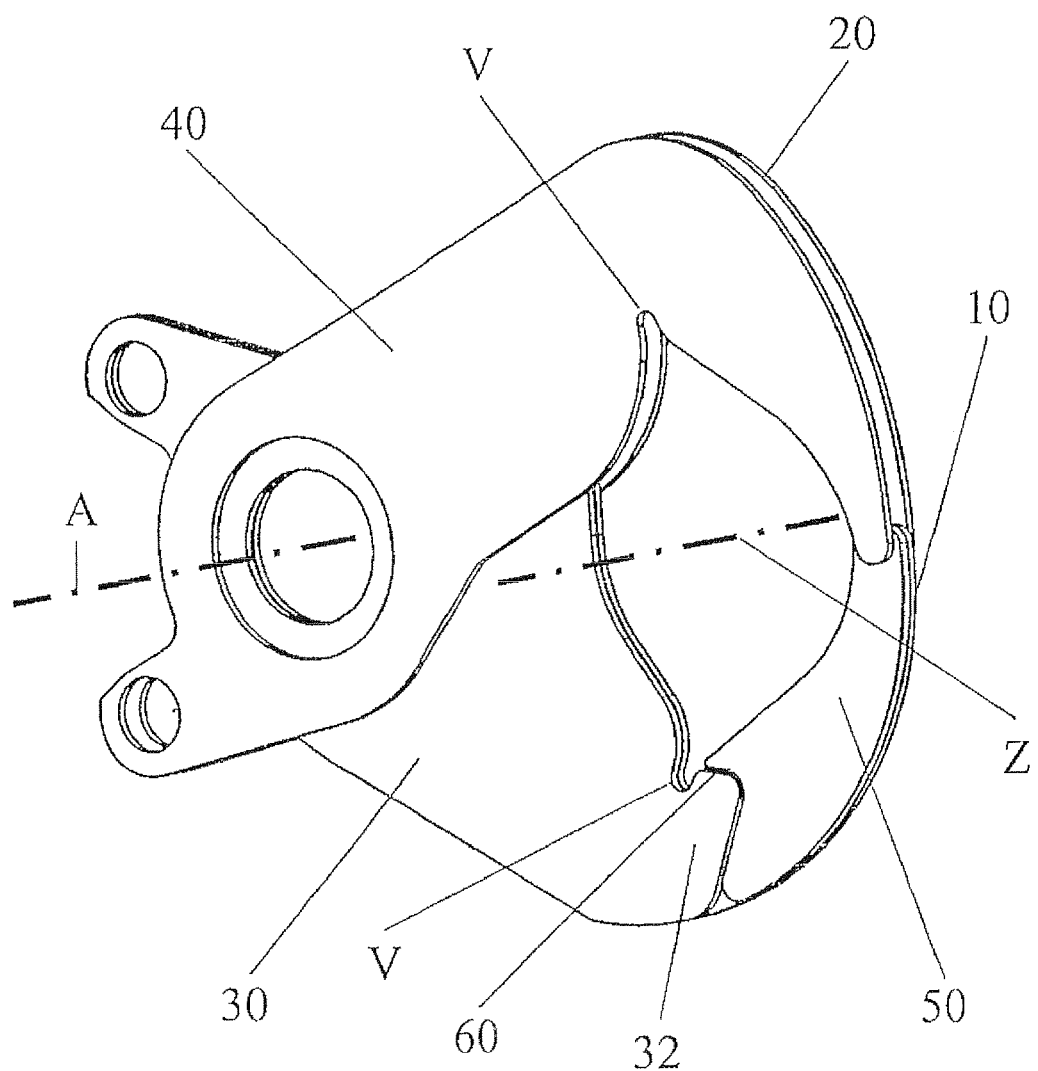
FIG. 2 shows the embodiment of the pairs of displacer shears of the displacer assembly according to the invention as illustrated in FIG. 1 in a second position.

In FIG. 2 the displacer shears 10, 20, 30, 40 of the displacer assembly according to the invention are shown in a second position or constriction position. In this position the pairs of displacer shears 10, 20 and 30, 40 are moved towards each other axially with respect to the pivot axis A to such an extent that the first displacer shears 10, 30 of the pairs of displacer shears 10, 20 and 30, 40 bear against each other with their side surfaces that face towards each other.

In that respect it will be clearly seen that the reinforcement 50 is approximately identical in its contour to the part by which the displacer shear 30 has been shortened. The mutually facing end faces of the end portion 32 of the displacer shear 30 and the plate portion 50 enclose the gap 60 between them. That prevents collision between or hooking engagement of the displacer shears 10, 30 when the pairs of displacer shears 10, 20, 30, 40 are spread or moved towards each other. To improve that action the gap 60 is oriented at an acute angle relative to a plane extending perpendicularly through the plaited portion axis Z. In that case the gap 60 and the front side of the displacer shear 30, that is visible in FIG. 2, includes an angle which with the above-described acute angle makes up a right angle.

As the reinforcement 50 also corresponds in its thickness to the part by which the displacer shear 30 has been shortened, the front sides, which are visible in FIG. 2, of the displacer shear 30 and the plate portion 50 are disposed in one plane. That provides that the displacer shear 40 which slides along that surface can be guided without resistance over the gap formed between the displacer shear 40 and the plate portion 50 without becoming hooked at the gap 60. To ensure constriction without any problem and to reliably prevent hooking engagement of the displacer shear at the gap 60 the plate portion 50 can be slightly thicker than the end portion 32 of the displacer shear 30.

In that case the reinforcement or plate portion 50 fills up the space which is produced by the shortening of the displacer shear 30 when the displacer shear 30 bears against the displacer shear 10. In other words, it extends from the end portion 32 of the displacer shear 30 to the tip of the end, that is angled in a hook shape, of the displacer shear 10.

The pairs of displacer shears 10, 20, 30, 40 shown in FIG. 2 are illustrated in a constriction position in which the pairs of displacer shears 10, 20 and 30, 40 are moved together in the axial direction with respect to the plaited portion axis Z but are radially still spread. It is from that position that the constriction operation begins on the filled tubular packaging (not shown here). The constriction operation terminates when the diameter of the filled packaging casing is reduced to such an extent that there is no longer any filling material in the constricted region or plaited portion. The plaited portion which is formed from gathered tubular packaging material in that case fills the displacer hole formed from the recesses V of the displacer shears 10, 20, 30, 40 which have been moved together. Axial spreading then begins, that is to say the pairs of displacer shears 10, 20 and 30, 40 are moved away from each other in the direction of the plaited portion. Further filling material is displaced and a filling material-free plaited portion is formed between the pairs of displacer shears 10, 20 and 30, 40, so that one or two closure clamps or clips (not further shown) can be fitted onto the plaited portion. The displacer shears 10, 20, 30, 40 are then moved radially apart. That therefore gives the readiness position shown in FIG. 1, in which the plaited portion ends are released. The finished product in sausage form can be discharged from the clip machine and a new product in sausage form can be formed by a subsequent filling operation.

The provision of the reinforcement 50 on the displacer shear 10 fills up the free space which is produced by the use of the shortened displacer shear 30. If the pairs of displacer shears 10, 20 and 30, 40 are in the constriction position corresponding to FIG. 2 the tip of the displacer shear 40 lies on the reinforcement 50, along which the displacer shear 40 is guided during the constriction operation until it reaches the shortened displacer shear 30. The fact that the free space is filled up by the reinforcement 50 prevents tubular packaging from being pinched here or being hooked on the end portion 32 of the shortened displacer shear 30.

When the pairs of displacer shears 10, 20 and 30, 40 are in the readiness position the product in sausage form which has just been finished can be discharged from the clip machine. In this case an operation of threading in the suspension element of the product in sausage form is excluded by the shortened displacer shear 30.

It is to be noted that a displacer assembly of such a design configuration is not limited to the production of large-diameter products in sausage form and/or those in particularly delicate tubular packaging, but it is also suitable for the production of products in sausage form of any dimension and with any tubular packaging material.

In principle the reinforcement 50 can comprise the same material as the pairs of displacer shears 10, 20 and 30, 40. If they comprise metal the reinforcement 50 can be welded to the displacer shear 10. The reinforcement 50 can however also comprise plastic material. In that case it can be screwed to the displacer shear 10. As there are no extreme forces acting on the reinforcement 50 it may also be sufficient for the reinforcement 50 to be glued onto the displacer shear 10.

It is further possible for a reinforcement according to the invention to be retro-fitted to each displacer assembly which has the above-described pairs of displacer shears. In the simplest case the part which is cut off the displacer shear 30 can be applied in the form of the reinforcement 50 to the rear displacer shear 10.

The invention was described hereinbefore by means of the example of displacer shears which are pivotable about a common axis and which are movable radially towards each other for the constriction operation. It will be appreciated that the invention can also be implemented on displacer shears which are linearly reversibly movable towards each other.

The linearly operating displacer shears have a V-shaped recess which is directed towards the plaited portion axis and which is formed by laterally mutually juxtaposed tips. According to the invention one of the tips, which face towards the plaited portion axis, of the generally lower displacer shear can be shortened. A reinforcement corresponding to that shortening is then arranged on the associated, then upper, displacer shear.

The arrangement of the gap between the shortened displacer shear and the reinforcement corresponds to that in the embodiment corresponding to the Figures of drawings.

The invention claimed is:

1. A displacer assembly for a clip machine comprising:
   a first pair of displacer shears and a second pair of displacer shears arranged parallel thereto, each pair of displacer shears facing in the same direction,
   wherein the first pair of displacer shears comprises a top and a bottom displacer shear, the top and bottom displacer shears of the first pair of displacer shears being reversibly movable toward each other about a common pivot axis at the rear of the first pair of displacer shears, the contours of which are at least approximately identical in mirror image relationship and
   wherein the second pair of displacer shears comprises a top and a bottom displacer shear, the top and bottom displacer shears of the second pair of displacer shears being reversibly movable toward each other about a common pivot axis at the rear of the second pair of displacer shears, wherein said top displacer shear is at least approximately identical in contour to the top displacer shear of the first pair of displacer shears, and wherein said bottom shear is shorter than said bottom displacer shear of said first pair of displacer shears;
   wherein said bottom displacer shear of said first pair of displacer shears has a reinforcement attached to a side surface of said bottom shear facing said second pair of displacer shears, and wherein a combined contour of the reinforcement and the bottom shear of the second pair of the displacer shears at least approximately reproduces the contour of said bottom displacer shear of said first pair of displacer shears.

2. The displacer assembly as set forth in claim 1 wherein a gap is formed between a radially outwardly facing surface of the bottom displacer shear of the second pair of displacer shears and the surface facing theretowards of the reinforcement.

3. The displacer assembly as set forth in claim 2 wherein the gap is oriented at an acute angle to an axis of the plaited portion that is parallel to the pivot axis.

4. The displacer assembly as set forth in claim 1 wherein the reinforcement is screwed onto the first displacer shear of the first pair of displacer shears.

5. The displacer assembly as set forth in claim 1 wherein the reinforcement is welded to the first displacer shear of the first pair of displacer shears.

6. The displacer assembly as set forth in claim 1 wherein the reinforcement is integrally connected to the first displacer shear of the first pair of displacer shears.

7. The displacer assembly as set forth in claim 1 wherein the displacer shears of the first and second pairs of displacer shears are pivotable about a common axis A, movable radially reversibly towards each other.

8. The displacer assembly as set forth in claim 7 wherein the displacer shears of the pairs of displacer shears are movable linearly reversibly towards each other along the pivot axis.

* * * * *